United States Patent Office 3,660,438
Patented May 2, 1972

3,660,438
ALKYLHYDROXYPHENYLALKANOYL HYDRAZINES
Martin Dexter, Briarcliff Manor, N.Y., assignor to Ciba-Geigy Corporation, Greenburgh, N.Y.
No Drawing. Continuation-in-part of application Ser. No. 811,664, Mar. 28, 1969. This application Apr. 13, 1970, Ser. No. 28,048
Int. Cl. C07c *103/22*
U.S. Cl. 260—404.5                                       6 Claims

ABSTRACT OF THE DISCLOSURE

Novel alkylhydroxyphenylalkanoyl-hydrazine compounds are prepared by reacting an ester of an alkylhydroxyphenylalkanoic acid or the corresponding alkanoic acid chloride with either hydrazine or an acyl hydrazide. The alkylhydroxyphenylalkanoyl-hydrazines are useful as stabilizers of organic materials which are subject to oxidative deterioration.

---

This application is a continuation-in-part of the copending application Ser. No. 811,664, filed Mar. 28, 1969, now abandoned.

DETAILED DESCRIPTION

This invention relates to novel alkylhydroxyphenylalkanoyl-hydrazines which are useful as stabilizers of organic materials which are subject to oxidative deterioration.

When these compounds are incorporated in an organic material, either alone or in combination with other stabilizers or synergists, the organic material will be protected against oxidative and/or thermal deterioration.

The novel alkylhydroxyphenylalkanoyl-hydrazine antioxidant compounds of the present invention are represented by the formula:

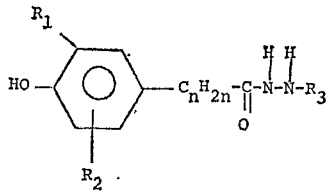

wherein $R_1$ is a lower alkyl group containing from 1 to 6 carbon atoms, $R_2$ is hydrogen or a lower alkyl group containing from 1 to 6 carbon atoms, $R_3$ is hydrogen. An alkanoyl group containing 2 to 18 carbon atoms or a group represented by the formula

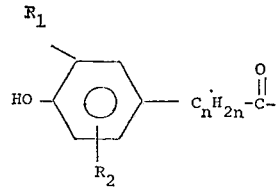

and $n$ is an integer from 0 to 5.

Illustrative examples of lower alkyl groups that are substituted on the phenyl moiety are methyl, ethyl, propyl, isopropyl, butyl, t-butyl, pentyl, hexyl and the like. The preferred groups are the tertiary alkyls. Illustrative examples of the higher alkyl groups are heptyl, octyl, decyl, dodecyl, tetradecyl, hexadecyl, octadecyl and the like, both straight chain and branched chain.

The novel alkylhydroxyphenylalkanoyl-hydrazine compounds of the present invention are prepared by a procedure involving the reaction between hydrazine and an ester of an alkylhydroxyphenylalkanoic acid represented by the formula:

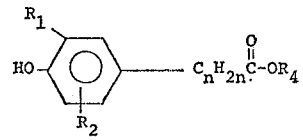

wherein $R_1$ and $R_2$ are as defined above and $R_4$ is an alkyl.

The starting alkylhydroxyphenylalkanoic acids and the esters thereof that are used as starting materials are described in U.S. Pat. 3,330,850. Some of the procedures used in the syntheses of said acids and their esters include the reaction of alkali metal salts of an alkylated phenol with methyl acrylate; the reaction of alkali metal salts of alkylated phenols with esters of -haloalkanoic acids; the reaction of alkylhydroxybenzyl chlorides with alkali metal cyanides to obtain alkylhydroxyphenylacetonitriles followed by hydrolysis to the acids.

The lower alkyl esters of these alkylhydroxyphenylalkanoic acids, when reacted with hydrazine, yield a monoacylhydrazine. The aforesaid esters can be hydrolyzed with a strong base, such as sodium hydroxide, to yield the sodium salt of the corresponding acid. The sodium salt may be converted to the free acid by conventional procedures, that is, by acidification with a mineral acid, dried and then reacted with an agent such as thionyl chloride to form the acid chloride. The acid chlorides are useful reagents for preparing diacylhydrazines.

Monoacyl-hydrazine products can be acylated further. Illustrative acylating agents are acetyl chlorides, propionyl chloride, octanoyl chloride, stearoyl chloride, and the like. Since hydrogen chloride is liberated, the reaction is conducted in the presence of an acid acceptor. Suitable acid acceptors are sodium hydroxide, sodium carbonate, pyridine, triethylamine and the like.

The reaction can be conducted in the presence of an inert solvent. Useful solvents include, for example, methylene chloride, chloroform, benzene and the like.

The following examples detail the preparation of the compounds of the present invention and are therefore to be considered as illustrative but not limiting the invention.

EXAMPLE I 53.8 g. (1.07 mol) of hydrazine hydrate was dissolved in 600 ml. absolute methanol and to this solution was added, with stirring, 71.8 g. (0.25 mol) of methyl β-(3,5-di-t-butyl-4-hydroxyphenyl)propionate. The mixture was allowed to stand at room temperature for 48 hours. The methanol was removed by distillation, under a nitrogen atmosphere, and 500 mls. water was added to the residue. After stirring for one hour, a white crystalline material was obtained and was separated by filtration. There was obtained a yield of 71.7 g. of the product, β-(3,5-di-t-butyl-4-hydroxyphenyl)propionyl-hydrazide melting between 154°–155.5° C. On recrystallization from a mixture of ethanol and water, a melting point of 155.5°–156.5° C. was noted.

*Analysis.*—Calculated (percent): C, 69.8; H, 9.7; N, 9.6. Found (percent): C, 69.7; H, 9.5; N, 9.8.

EXAMPLE II 23.2 g. (0.08 mol) of the β-(3,5-di-t-butyl-4-hydroxyphenyl)propionyl-hydrazide product (obtained by the procedure of Example I, supra) was dissolved in 1000 mls. methylene chloride. To this solution was added 200 mls. water, 20 g. sodium carbonate followed by 28.9 g. of 90% β-(3,5-di-t-butyl - 4 - hydroxyphenyl propionyl chloride (0.088 mol). After stirring for one hour, while maintaining the reaction mixture at room temperature, the methylene chloride was removed by distillation. The residue was filtered and washed with water. There was obtained 48.7 g. of N,N'-bis-β-(3,5-di-t-butyl-4 - hydroxyphenyl) - propionylhydrazine melting between 223° and 225° C. After recrystallization from ethanol, a melting point of 225°–227° C. was noted.

*Analysis.*—Calculated (percent): C, 73.9; H, 9.5; N, 5.1. Found (percent): C, 73.8; H, 9.4; N, 5.1.

EXAMPLE III 59.3 g. (0.2 mol) β-(3,5-di-t-butyl-4-hydroxyphenyl) propionylchloride and 500 mls. benzene were placed in a reaction flask equipped with a stirrer, thermometer, condenser and dropping funnel. To the solution were added slowly 5 g. hydrazine hydrate (0.1 mol), 8 g. (0.2 mol) sodium hydroxide and 75 mls. water at 25° C. After one hour, a very thick precipitate was obtained. The mixture was stirred for 2½ hours whereupon benzene was evaporated and the residue slurried up with water, filtered, washed with water and then dried. There was obtained 55 g. of N,N'-bis-β-(3,5-di-t-butyl-4-hydroxyphenyl) - propionylhydrazine. The white solid material was recrystalized from an ethyl acetate/hexane mixture. A yield of 37.4 g. (67.8%) of the product was obtained; its melting point was between 227° and 229° C.

EXAMPLE IV 3.60 g. (0.012 mol) of stearoyl chloride in 20 ml. benzene was added, accompanied by stirring, to 3.88 g. (0.013 mol) of 3,5-di-t-butyl-4-hydroxyphenyl)propionyl - hydrazide in 40 mls. 1:1 benzene:pyridine and the mixture was heated on a steam bath for 20 minutes. The mixture was cooled and poured into 200 mls. water–200 mls. petroleum mixture in a separatory funnel. This was followed by washing with water, sodium carbonate, drying, etc., and concentration on a steam bath. A solid material was obtained on cooling and later washing with acetone, the desired product, N-stearyl-N'-[β-(3,5-di-t-butyl-4-hydroxyphenyl)-propionyl]-hydrazine was obtained melting between 109° and 113° C. After recrystallization several times from acetone, a product was obtained melting between 111.5° and 112° C.

*Analysis.*—Calculated (percent): C, 75.21; H, 11.18; N, 5.01. Found (percent): C, 74.98; H, 10.93; N, 4.97.

EXAMPLE V

Following the procedure described in Example II, except for the use of β-(3,5-di-t-butyl-4-hydroxyphenyl)-propionyl-hydrazine and β-(3-t-butyl-5-ethyl-4 - hydroxyphenyl)-propionyl chloride, there is obtained N-[β - (3-ethyl-5-t-butyl-4-hydroxyphenyl)-propionyl]-N'-β - (3,5-di-t-butyl-4-hydroxyphenyl)propionyl-hydrazine.

EXAMPLE VI

Following the procedure described in Example II except for the use of β-(3,5-t-butyl-4-hydroxyphenyl)-propionyl-hydrazine and 3,5-t-butyl-4-hydroxybenzoyl chloride, there is obtained N-[β-(3,5-di-t-butyl-4 - hydroxyphenyl)propionyl]-N'-(3,5 - di - t - butyl - 4 - hydroxybenzoyl)-hydrazine.

EXAMPLE VII

Following the procedure described in Example I except for the use of methyl β-(3,5-diisopropyl-4-hydroxyphenyl)-propionate and hydrazine hydrate, there is obtained β-(3,5-diisopropyl-4-hydroxyphenyl)-propionyl-hydrazine. The last mentioned product is then reacted with stearoyl chloride (using the procedure described in Example II, supra) to obtain N-stearoyl-N'-[β-(3,5-diisopropyl-4-hydroxyphenyl)-propionyl]-hydrazine.

EXAMPLE VIII

Following the procedure described in Example I, supra except for the use of methyl β-(3-methyl-5-t-hexyl-4-hydroxyphenyl)-propionate and hydrazine, there is obtained β-(3-methyl-5-t-hexyl-4-hydroxyphenyl)-propionyl - hydrazine. The last mentioned compound is then reacted with octanoyl chloride, following the procedure described in Example II to obtain N'-octanoyl-N-[β-(3-methyl-5-t-hexyl-4-hydroxyphenyl)-propionyl]-hydrazine.

The active compounds of the present invention are useful as stabilizers of organic materials normally subject to oxidative deterioration. Such organic materials include: synthetic organic polymeric substances such as vinyl resins formed from the polymerization of vinyl halides or from the copolymerization of vinyl halides with unsaturated polymerizable compounds, e.g., vinyl esters, α,β-unsaturated aldehydes and unsaturated hydrocarbons such as butadienes and styrene; polyolefins such as polyethylene, polypropylene, polybutylene, polyisoprene, and the like, including copolymers of poly-β-olefins, polyurethanes and polyamides such as polyhexamethylene adipamide and polycaprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials which can be stabilized by the active compounds of the present invention include lubricating oil of the aliphatic ester type, i.e., di(2-ethylhexyl)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like hydrocarbon materials such as gasoline, mineral oil, fuel oil, drying oil, cutting fluids, waxes, resins, and the like, fatty acids such as soaps and the like.

In general one or more of the stabilizers of the present invention are employed in amounts, in toto, of from about 0.005 to about 5% by weight of the composition containing the organic material. A particularly advantageous range of the present stabilizers for polyolefins such as polypropylene is from about 0.05% to about 2%.

The stabilizers employed in this invention can be also used in combination with other stabilizers or additives. Especially useful co-stabilizers are di-lauryl-beta-thiodipropionate and di-stearyl-beta-thiodipropionate.

The following formula represents co-stabilizers which are in certain instances very useful in combination with the stabilizers of this invention:

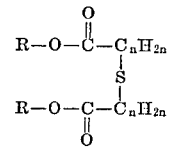

wherein R is an alkyl group having from 6 to 24 carbon atoms; and $n$ is an integer from 1 to 6. The above co-stabilizers are used in the amount of from 0.01 to 2% by weight of the organic material, and preferably from 0.1 to 1%.

Other antioxidants, antiozonants, thermal stabilizers, ultraviolet light absorbers, coloring materials, dyes, pigments, metal chelating agents, etc. may also be used in the compositions of the invention.

Since the oxidation of organic materials is slow at ambient temperatures, even in the absence of antioxidants, the testing of the effects of antioxidants must be conducted at high temperatures in order to obtain results within a convenient time. The tests conducted on the following oven aging in a tubular oven, with an air flow of 400 feet per minute at a temperature of 150° C.

EXAMPLE IX

A batch of unstabilized polypropylene powder (Hercules Profax 6501) was thoroughly blended with 0.5% by weight of β-(3,5-di-t-butyl-4-hydroxyphenyl) propionylhydrazide and another batch with 0.5% by weight of N,N'-bis-β-(3,5-di-t-butyl-4 - hydroxyphenyl) propionylhydrazine. The blended materials were then milled on a two-roller mill at 182° C., for ten minutes, after which time the stabilized polypropylene was sheeted from the mill and allowed to cool.

The milled polypropylene sheets were then cut into 5 pieces and pressed for seven minutes on a hydraulic press at 218° C. and Other antioxidants, antiozonants, thermal stabilizers, ultraviolet light absorbers, coloring materials, dyes, pigments, metal chelating agents, etc. may also be used in the compositions of the invention.

Since the oxidation of organic materials is slow at ambient temperatures, even in the absence of antioxidants, the testing of the effects of antioxidants must be conducted at high temperatures in order to obtain results within a convenient time. The tests conducted on the following material were made following oven aging in a tubular oven, with an air flow of 400 feet per minute at a temperature of 150° C.

EXAMPLE IX-A

A batch of unstabilized polypropylene powder (Hercules Profax 6501) was thoroughly blended with 0.5% by weight of β-(3,5-di-t-butyl-4-hydroxyphenyl) propionyl-hydrazide and another batch with 0.5% by weight of N,N'-bis-β-(3,5-di-t-butyl-4 - hydroxyphenyl) propionyl-hydrazine. The blended materials were then milled on a two-roller mill at 182° C., for ten minutes, after which time the stabilized polypropylene was sheeted from the mill and allowed to cool.

The milled polypropylene sheets were then cut into pieces and pressed for seven minutes on a hydraulic press at 218° C. 2,000 pounds per square inch pressure. The resultant sheets of 25 mil thickness were tested for resistance to accelerated aging in a forced draft oven at 150° C. The results are set out in Table I below.

TABLE I

| Additive(s): | Oven aging at 150° C., hours to fail |
|---|---|
| 0.5% β-(3,5-di-t-butyl-4-hydroxyphenyl)propionyl-hydrazide | 130 |
| 0.1% β-(3,5-di-t-butyl-4 - hydroxphenyl)propionyl-hydrazide+0.5% DSTDP [1] | 485 |
| 0.5% N,N'-bis-β-(3,5-di-t-butyl-4-hydroxyphenyl)-propionyl-hydrazine | 545 |
| 0.1% N,N'-bis-β-(3,5-di-t-butyl-4-hydroxyphenyl)-propionyl-hydrazine+0.5% DSTDP [1] | 915 |
| Polypropylene (unstabilized) | 3 |

[1] Distearylthiodipropionate (a synergist for phenolic antioxidants).

The above data clearly indicated the significant increase in the stabilization of polypropylene upon addition of the antioxidants of the present invention.

EXAMPLE X 50 parts of polypropylene unstabilized resin (Hercules Profax 6501), 0.5% by weight (based on unstabilized resin) of β - (3,5-di-t-butyl-4-hydroxyphenyl)-propionyl-hydrazide were thoroughly blended and then fluxed on a 2-roll mill at 182° C. for two minutes. Copper dust (0.75 part, 1.5% by weight) on the unstabilized resin; purified electrolytically) was milled into the fluxed resin material on the mill at 182° C. for 3 minutes. Thereafter, the mixture thus obtained was sheeted from the mill, allowed to cool, cut in small pieces and pressed on a hydraulic press to a thickness of 25 mils. The hydraulic press operation was carried out by pressing 185° C. for 1 minute at contact pressure and at 185° C. for two minutes, at 175 lb./sq. in. pressure and then cooled at the same pressure.

The cooled, pressed specimens were cut into ½ inch by 1 inch by 25 mil pieces and these were tested for aging in a forced draft oven at 149° C. The specimens were visually examined at periodic intervals for signs of deterioration, i.e., embrittlement, surface crazing, etc. The thus stabilized polypropylene deteriorated after 35 hours.

EXAMPLE XI

Using the procedure described in Example X, a specimen was also prepared wherein N,N'-bis-β-(3,5-di-t-butyl-4-hydroxyphenyl)-propionyl-hydrazine was added to unstabilized polypropylene resin. The oven aging life of this composition was 315 hours.

When 0.05% of the above named stabilizer is used substantial stabilization is still obtained.

In contrast, when 1.5% of copper dust was attempted to be milled into the unstabilized resin, extensive deterioration occurred and further milling was prevented.

EXAMPLE XII

Unstabilized polypropylene powder (Hercules Profax 6501) was blended with 0.5% by weight of β-(3,5-di-t-butyl - 4-hydroxyphenyl)-propionyl-hydride. The blend was used to coat copper wire. The coated wire was submitted to oxidative and thermal degradation and was found to contain considerable stability. In contrast, the unstabilized polypropylene coating was found to deteriorate in a very short period of time. Even greater stabilization is attained when said stabilizer is used in a 10% and 2% concentration.

EXAMPLE XIII

Cyclohexene, freshly distilled, is stabilized by the addition thereto of 0.001% by weight of β-(3,5-di-t-butyl-4-hydroxyphenyl)-propionyl-hydrazide. The effectiveness of this stabilizer in cyclohexene is tested by the ASTM D525–55 oxidation test with a modification that only 10 parts by volume of cylclohexene ran 89 minutes to failure while the unstabilized cyclohexene failed after 30 minutes.

It should also be mentioned that phosphite esters may also be used in stabilized formulations containing the novel antioxidants of the present invention and such phosphite compounds include dialkylphosphites such as, for example, distearylphosphite, dilaurylphosphite, and the like, trialkylphosphites such as, for example trilaurylphosphite, triethylhexylphosphite, and the like, and trialkarylphosphites such as, for example trinonylphenylphosphites, and the like.

EXAMPLE XIV

Stabilized rubber is prepared by mixing in the cold:

| | Parts |
|---|---|
| Havea latex crepe | 100 |
| Stearic acid | 1.5 |
| Zinc oxide | 5.0 |
| Diphenylguanidine | 1.0 |
| Sulfur | 2.5 |
| β - (3,5-di-t-butyl-4-hydroxyphenyl)propionyl-hydrazide | 1.0 |

The resultant mixture is vulcanized at 140° C. and tested according to ASTM D–1206–52T. It was found that the time required to elongate a test strip from 120 mm. to 170 mm. is considerably shorter for the unstabilized rubber as compared with the stabilized rubber. Similarly, styrene-butadiene rubber as well as a blend of natural rubber (50 parts) and polybutadiene rubber (50 parts) are stabilized.

EXAMPLE XV

High impact polystyrene resin containing elastomer (i.e., butadiene-styrene) is stabilized against loss of elongation properties by incorporation of 0.5% by weight of β - (3,5-di-t-butyl-4-hydroxyphenyl)-propionyl-hydrazine. Under the test conditions described below, the stabilized resin retains a higher percentage of its original elongation properties, whereas the unstabilized resin retains lessened elongation properties.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° C. and a pressure of 2000 pounds per square inch into a sheet of uniform thickness (25 mils). The sheets are then cut into strips, approximately 4 x 0.5 inches. A portion of these strips, is then measured for length of elongation in the Instron tensile tester (Instron Engineering Corporation, Quincy, Mass.). The remaining portion of the strips is aged in a forced draft oven for six weeks at 75° C. and thereafter tested for elongation.

EXAMPLE XVI

High impact polystyrene resin containing elastomer (i.e., butadiene-styrene) is stabilized against loss of elongation properties by incorporation of 0.5% by weight of N,N' - bis-β-(3,5-di-t-butyl-4-hydroxyphenyl)-propionyl-hydrazine. Under the test conditions described below, the stabilized resin retains a higher percentage of its original elongation properties, whereas the unstabilized resin retains less elongation properties. A substantial improvement in stability is also noted when only 0.05% of the stabilizer is employed.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° C. and a pressure of 2000 pounds per square inch into a sheet of uniform thickness (25 mil). The sheets are then cut into strips, approximately 4 x 0.5 inches. A portion of these strips is then measured for length of elongation in the Instron Tensile tester (Instron Engineering Corporation, Quincy, Mass). The remaining portion of the strips is aged in a force draft oven for 6 weeks at 75° C. and thereafter tested for elongation.

EXAMPLE XVII

A mixture of 1 mole nylon 6,6 salt (hexamethylene diamine adipate) and 1 mole percent hexamethylene diamine diacetate and 0.5% by weight on N,N'-bis-β-(3,5-di-t-butyl-4-hydroxyphenyl)-propionyl-hydrazine is polymerized and then extruded at 270° C. The thus stabilized nylon 6,6 shows considerably less color development and substantially less loss in weight after aging at 140° C. for 65 hours than the sample without the stabilizer. Substantially similar results are obtained when 0.5% of the aforesaid stabilizer is incorporated into nylon 6,6 flakes before extrusion.

EXAMPLE XVIII

When 0.5% on N,N'-bis-β-(3,5-di-t-butyl-4-hydroxyphenyl)-propionyl-hydrazine was added to a polyacetal resin containing an acid scavenger such as dicyandiamide, it was noted that the rate of weight loss at 230° C. after 45 minutes (simulating processing conditions) was considerably less than the unstabilized (or control) resin containing only the acid scavenger. Improved stability of the resin was also noted when samples containing the aforesaid acid scavenger and stabilizer were maintained at 143° C. for 200 hours as compared with the control containing only the acid scavenger.

The invention has been described with respect to certain preferred embodiments and various modifications and variations thereof will become obvious to persons skilled in the art. It is therefore to be understood that such modifications and variations are to be included within the spirit and scope of this invention.

What is claimed is:

1. An alkylhydroxyphenylalkanoyl-hydrazine compound of the formula

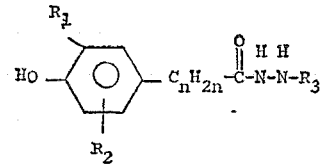

wherein $R_1$ is a lower alkyl group containing from 1 to 6 carbon atoms;

$R_2$ is a lower alkyl group containing from 1 to 6 carbon atoms;

$R_3$ is hydrogen, an alkanoyl group containing from 2 to 18 carbon atoms or a group represented by the formula:

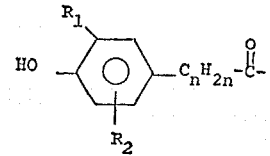

wherein $R_1$ and $R_2$ are as defined above and $n$ is a number from 0 to 5.

2. A compound according to claim 1 wherein $R_1$ and $R_2$ are tertiary alkyl groups.

3. A compound according to claim 1 wherein $R_1$ and $R_2$ are tertiary butyl groups.

4. A compound according to claim 1 wherein the alkylhydroxyphenylalkanoyl-hydrazine is β - (3,5-di-t-butyl-4-hydroxyphenyl)-propionyl-hydrazide.

5. A compound according to claim 1 wherein the alkylhydroxyphenylalkanoyl-hydrazine is N,N'-bis-β-(3,5-di-t-butyl-4-hydroxyphenyl)-propionyl-hydrazine.

6. A compound according to claim 1 wherein the alkylhydroxyphenylalkanoyl-hydrazine is N-stearyl-N'-[β-(3,5-di-t-butyl-4-hydroxyphenyl)-propionyl]-hydrazine.

References Cited

Chemical Abstracts, vol. 62, col. 13083 (1965) (Sheriman et al.).

HENRY R. JILES, Primary Examiner

H. I. MONTZ, Assistant Examiner

U.S. Cl. X.R.

260—45.9 R, 398.5, 559 H, 666.5, 814, 815, 887, 892, 896; 252—403